W. H. CURTIS.

MOP-HEAD.

No. 6,772. Reissued Nov. 30, 1875.

Witnesses.
Otto Hufeland
Chas. Wahlers.

Inventor.
William H. Curtis
pr
Van Santvoord & Hauff
Attys

N. PETERS, PHOTO-LITHOGRAPHER, WASHINGTON, D. C.

UNITED STATES PATENT OFFICE.

WILLIAM H. CURTIS, OF CHICAGO, ILLINOIS, ASSIGNOR TO CHARLES B. CLARK, JOHN K. CLARK, EDWIN L. FERGUSON, AND HENRY R. CLARK.

IMPROVEMENT IN MOP-HEADS.

Specification forming part of Letters Patent No. 149,999, dated April 21, 1874; reissue No. 6,772, dated November 30, 1875; application filed November 10, 1875.

*To all whom it may concern:*

Be it known that I, WILLIAM H. CURTIS, of the city of Chicago, county of Cook and State of Illinois, have invented a new and useful Improvement in Mop-Heads, which improvement is fully set forth in the following specification, reference being had to the accompanying drawing, in which—

Figure 1:
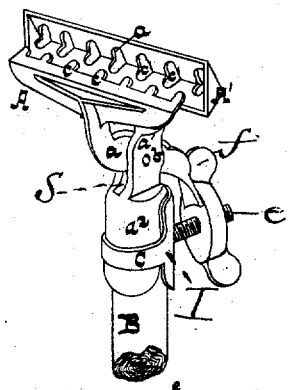
Figure 2:
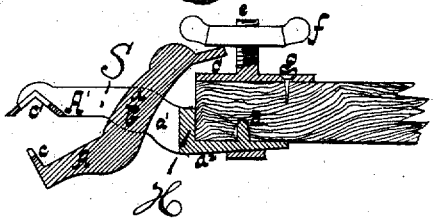

Figure 1 is a perspective view of the improved mop-head. Fig. 2 is a longitudinal section taken transversely through the jaws.

Similar letters indicate corresponding parts.

This invention relates to mop-heads; and it consists in a fixed jaw, to the shank of which is pivoted the shank of a movable jaw, in such a manner that the tail of the movable jaw extends toward the handle, where it comes against a traveling nut, by which the movable jaw is made to swing toward the fixed jaw when it is desired to clamp anything between them. The nut travels on a screw-thread formed on a pin, which projects from the side of the ring, and the arrangement is such that when the nut is screwed in one direction the movable jaw is moved toward the fixed jaw, and when it is screwed in the opposite direction the movable jaw falls away from the fixed jaw. The jaws are so constructed as to articulate, one jaw being made angular in cross-section, so as to receive in its angle the edge of the other jaw, and thereby firmly grasp the mop or article placed between them.

The letter A designates the movable jaw, the shank *a* of which passes through a slot, *s*, formed in the shank $a^1$ of the fixed jaw A′, where it is secured by a pivot, *b*, on which it swings. The shank $a^1$ of the fixed jaw terminates below in a semi-cylindrical or half socket, $a^2$, which embraces the handle B, near its end, and the interior of the socket is provided with a spur, *d*, (seen in Fig. 2,) which enters a hole made for it in the side of the handle, and prevents the parts from moving endwise upon each other, the end of the socket having a square head, H, against which the end of the handle can rest. The socket is made tapering on its outside from the head H toward its end, and after it is arranged upon the handle it is secured thereto by means of a ring-plate, C, which is slipped over the handle and socket, so as to compress the socket firmly upon the handle as the ring is driven along the tapering part. The plate I of the ring forms the remainder of the socket, and it is provided with a laterally-projecting pin, *e*, having a screw-thread cut thereon, on which is placed a wing-nut, *f*, the outer end of the screw being upset to prevent the removal of the nut. After the ring-plate is in place a small wood-screw, *g*, is screwed through a hole in its base into the handle, to prevent it from slipping back. The movable jaw A is made so as to enter the angle of the fixed jaw when the two jaws are brought together, the jaw A being hollow or angular, to receive the opposing jaw, which also overlaps the lower division of the jaw A′. The jaw A is provided with projecting teeth *c*, which project into the hollow jaw A′, and aid the jaws to firmly clamp anything introduced between them, and the jaw A is also provided with holes *c′* opposite the teeth *c* of the other jaw, to aid in grasping the fabric from which the mop is made. The ends of the jaw A′ are provided with projecting pieces *h h*, which overlap the adjacent teeth *c c* of the movable jaw, and aid in clamping the article which is to be held by the jaws. The tail of the shank *a* of the movable jaw extends through the slot of the other jaw, and is curved in such a manner as to approach the handle B, and come between it and the nut *f*, against whose smooth inner surface the tail of the shank is held by the gravity of the movable jaw.

When the nut is turned forward on the screw-pin it causes the movable jaw to swing toward the fixed jaw, and when it is turned in a reverse direction the movable jaw is allowed to fall away from the fixed jaw.

What I claim as new, and desire to secure by Letters Patent, is—

1. The combination of a fixed trough-shaped jaw, A′, with a movable jaw, having an edge constructed to enter the angle of the fixed jaw, for clamping the mop, substantially as described.

2. The trough-shaped jaw A′, having the openings *c′*, in combination with the jaw A, having the projections *c*, constructed to enter said openings, substantially as and for the object specified.

3. The combination of the fixed trough-shaped jaw, having a slotted shank and a socket secured to the handle B, with the movable jaw A, pivoted in the slotted shank of the fixed jaw, and having a rearwardly-projecting lever, constructed to be operated by a screw-nut for causing the movable jaw to approach and recede from the fixed jaw, and the said movable jaw having an edge constructed to enter the angle of the fixed trough-shaped jaw, for clamping a mop therein, substantially as described.

In testimony that I claim the foregoing I have hereunto set my hand this 4th day of November, 1875.

WILLIAM H. CURTIS.

Witnesses:
N. C. GRIDLEY,
F. A. HERRING.